Figure 13:
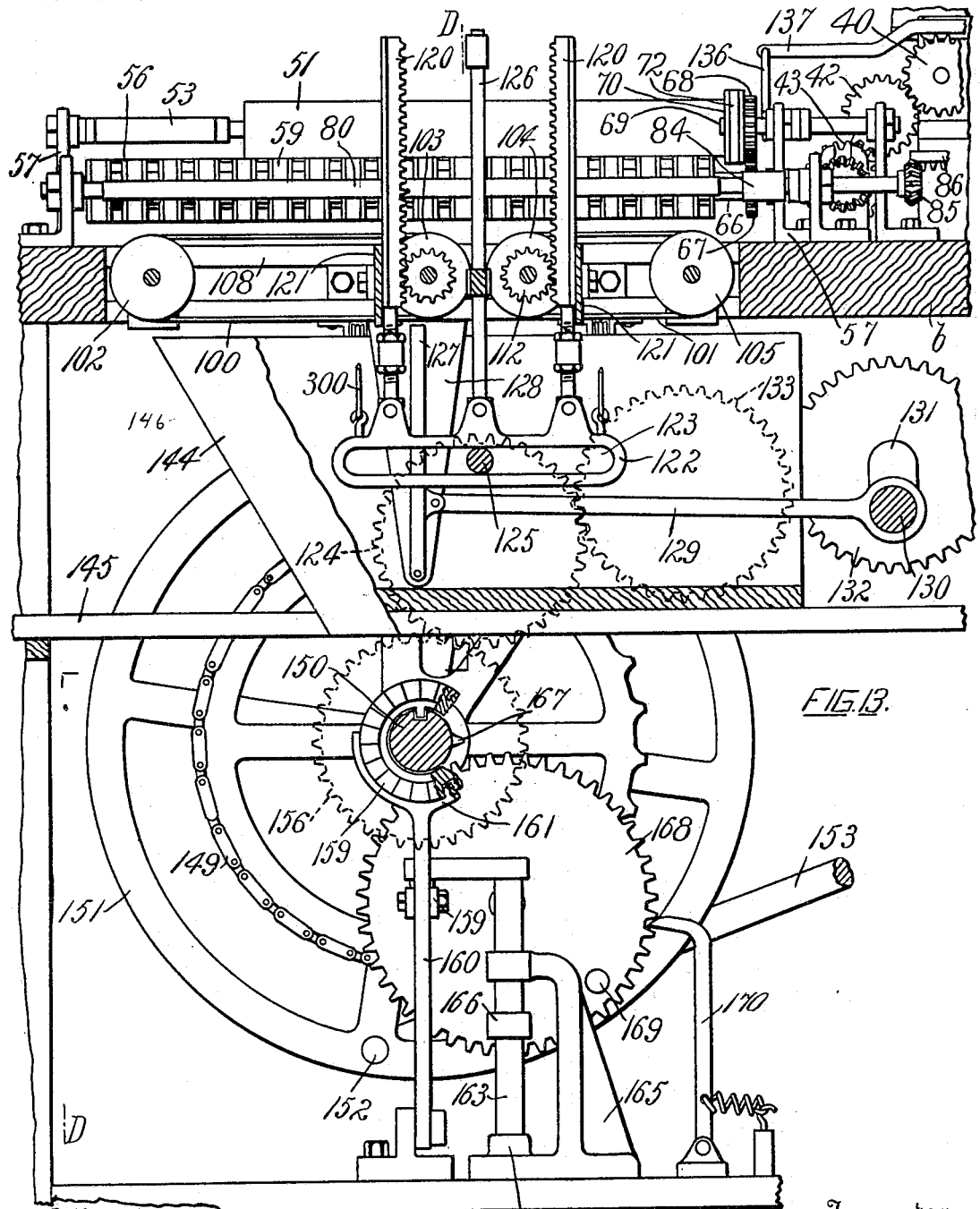

No. 758,765. PATENTED MAY 3, 1904.
G. A. MARIER.
MACHINE FOR THE TREATMENT OF TOBACCO LEAVES.
APPLICATION FILED JUNE 1, 1903.
NO MODEL. 4 SHEETS—SHEET 1.
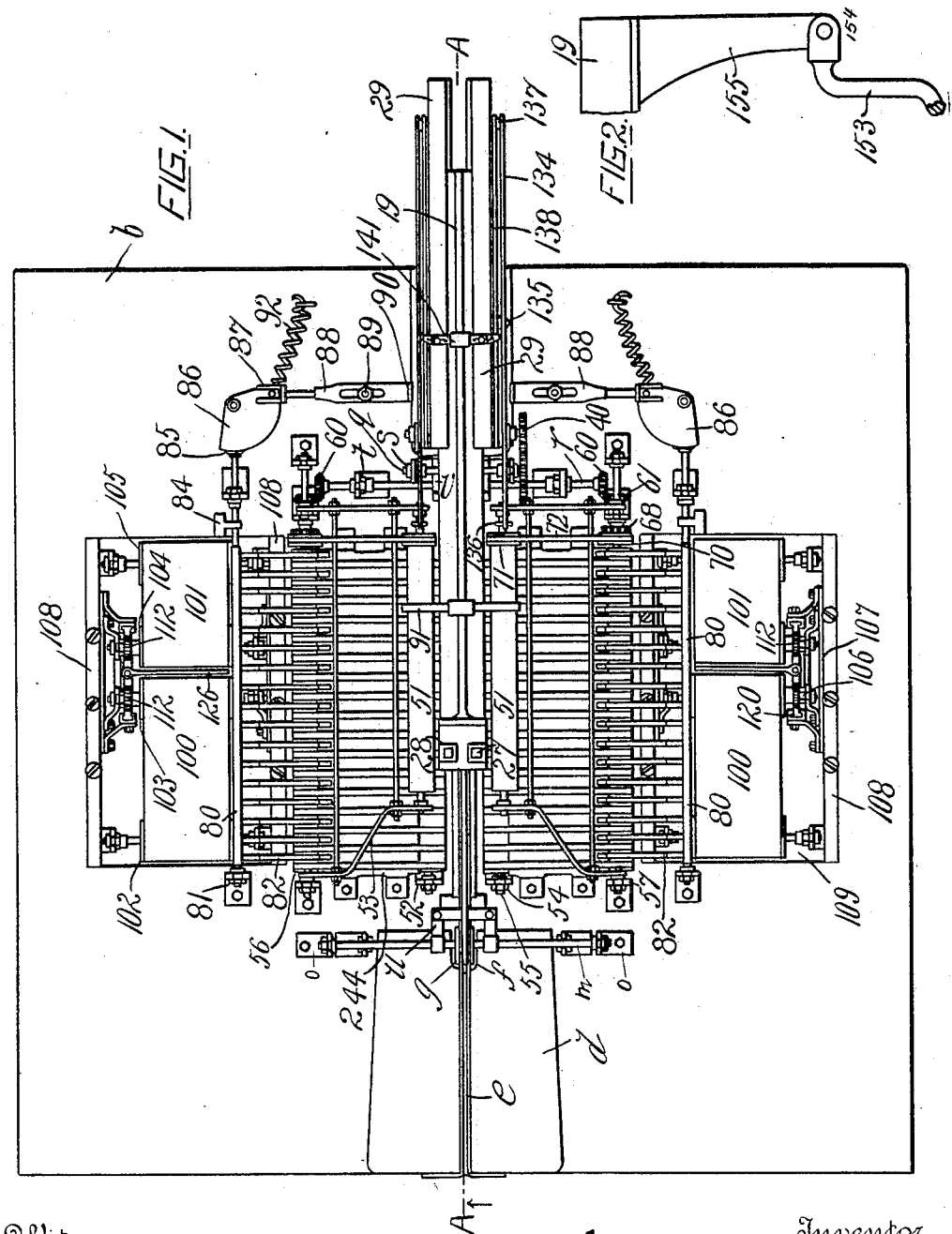

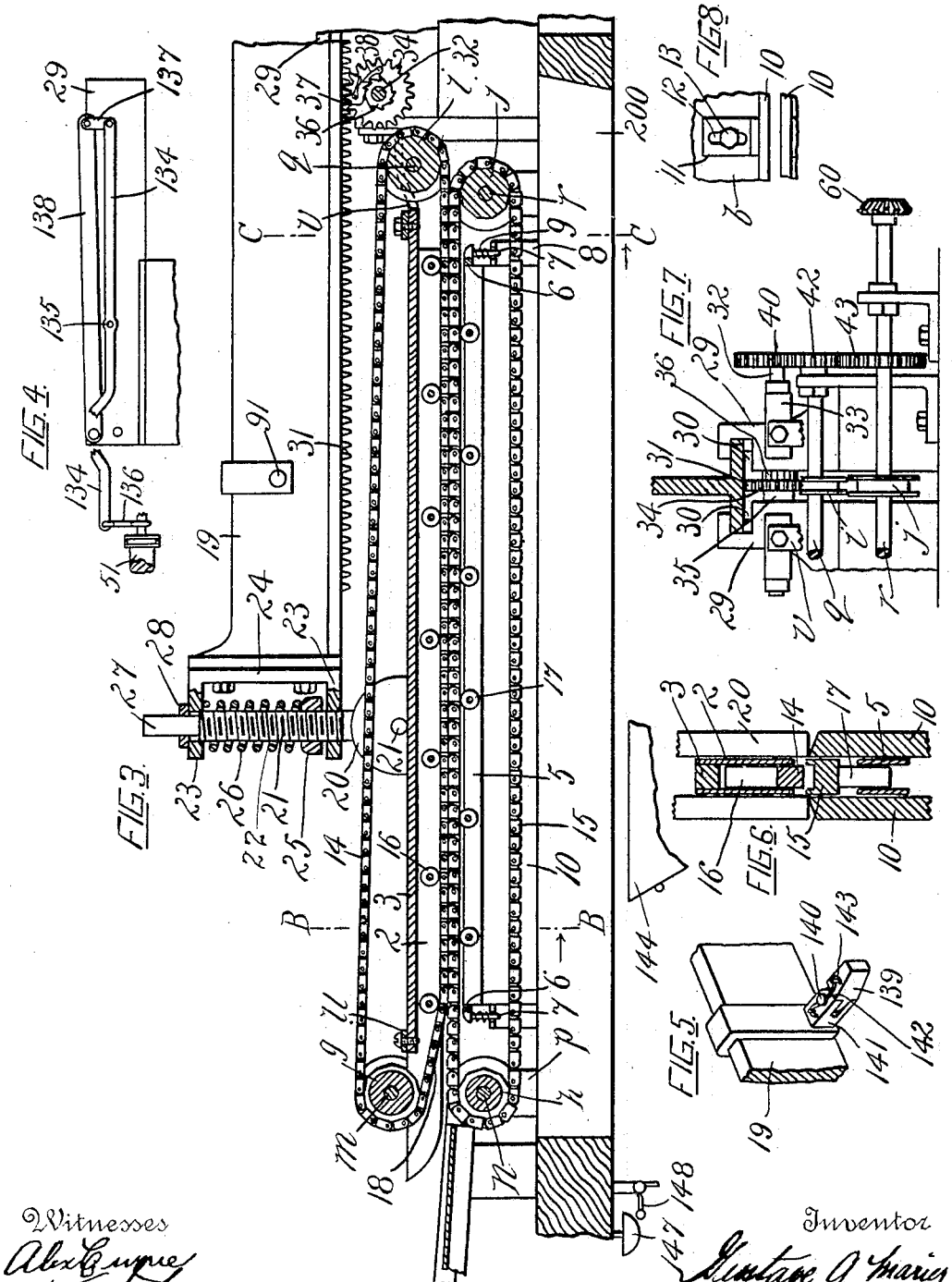

No. 758,765. PATENTED MAY 3, 1904.
G. A. MARIER.
MACHINE FOR THE TREATMENT OF TOBACCO LEAVES.
APPLICATION FILED JUNE 1, 1903.
NO MODEL. 4 SHEETS—SHEET 3.
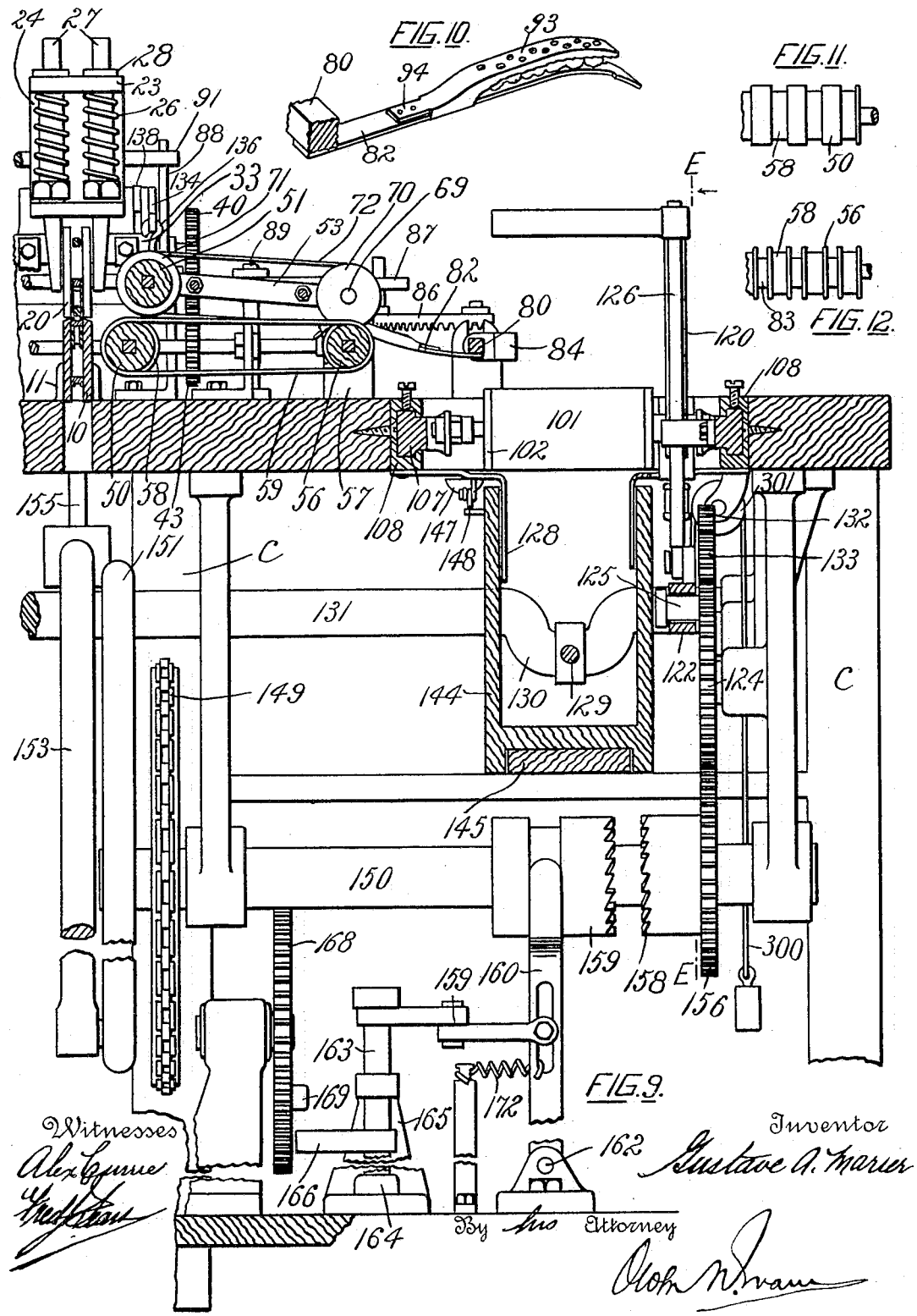

No. 758,765. PATENTED MAY 3, 1904.
G. A. MARIER.
MACHINE FOR THE TREATMENT OF TOBACCO LEAVES.
APPLICATION FILED JUNE 1, 1903.
NO MODEL. 4 SHEETS—SHEET 4.

Witnesses
Inventor
Gustave A. Marier
By his Attorney

No. 758,765. Patented May 3, 1904.

UNITED STATES PATENT OFFICE.

GUSTAVE ANTOINE MARIER, OF MONTREAL, CANADA, ASSIGNOR TO
S. DAVIS & SONS, OF MONTREAL, CANADA, A FIRM.

MACHINE FOR THE TREATMENT OF TOBACCO-LEAVES.

SPECIFICATION forming part of Letters Patent No. 758,765, dated May 3, 1904.

Application filed June 1, 1903. Serial No. 159,651. (No model.)

*To all whom it may concern:*

Be it known that I, GUSTAVE ANTOINE MARIER, of the city of Montreal, Province of Quebec, Canada, have invented certain new and useful Improvements in Machines for the Treatment of Tobacco-Leaves; and I do hereby declare that the following is a full, clear, and exact description of the same.

This invention relates particularly to the preparation of tobacco-leaves for rolling, as in the wrapping of cigars. My improved machine is particularly adapted to the treatment of Sumatran tobacco, although it is applicable to the treatment of any kind of tobacco-leaf and for any purpose.

The object of my invention is to provide a machine which will in one continuous operation sever the stem and midrib from the leaf, separate the halves of the leaf from one another and dampen them, and book said halves in predetermined quantities.

To this end the invention may be said briefly to consist of the combination with a device for severing the stem and midrib from the leaf, of means for intermittently feeding the leaves to the severing device, means coacting with said severing device for sorting the halves of the leaves, means for dampening said halves simultaneously with the sorting thereof, and means for booking predetermined quantities of each kind of said leaf-halves.

More specifically speaking, the invention consists of a pair of blades arranged adjacent and substantially parallel to one another and with their cutting edges facing upwardly, a presser device bearing intermittently upon said blades, feeding means actuated in unison with said presser device for placing a leaf upon said blades during the retrograde movement of said presser device, means acting simultaneously with said feeding means for removing the severed halves of the leaf in different directions from said blades and piling them one upon another, means for dampening said leaf-halves, means for folding or booking said leaf-halves when a predetermined number of them have been piled, means for packing said booked halves in a receptacle, and a signal device for announcing when a predetermined number of books have been packed into said receptacle.

For full comprehension, however, of my invention reference must be had to the accompanying drawings, forming a part of this specification, wherein similar reference characters indicate the same parts, and in which—

Figure 14:
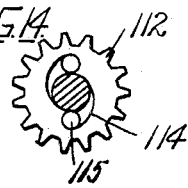

Figure 1 is a plan view of the machine constructed according to my invention. Fig. 2 is a detail side elevation illustrating the connection between the reciprocating rack and its actuating-pitman. Fig. 3 is a longitudinal vertical sectional view illustrating particularly the arrangement of the feed-chains relatively to the blades, the blades themselves, the presser-rollers, and the means for reciprocating said rollers and simultaneously actuating the feed-chains, this view being taken on line A A, Fig. 1. Fig. 4 is a detail elevation illustrating the means for intermittently raising the presser-roller of the lateral feed device. Fig. 5 is a detail perspective view of the latch which actuates the said presser-roller-raising means illustrated in Fig. 4. Fig. 6 is an enlarged detail vertical sectional view taken on line B B, Fig. 3, and illustrating particularly the blades, the presser-rollers bearing thereon, the chain-guides, and the chains guided therein. Fig. 7 is a transverse vertical sectional view taken on line C C, Fig. 3, and illustrating particularly the connection between the reciprocatory rack and the feed-chain rollers, the chains being omitted. Fig. 8 is a detail plan view of a portion of the blades, illustrating the manner of connecting them to the bed of the machine. Fig. 9 is a transverse vertical sectional view of one-half of the machine, taken on line D D, Fig. 13. Fig. 10 is a detail perspective view of one of the fingers of the fly and illustrating particularly the dampener carried thereon. Fig. 11 is a detail elevation of one end of one of the rollers of the laterally-traveling apron. Fig. 12 is a similar view of the other roller thereof. Fig. 13 is a longitudinal vertical sectional view taken on line E E, Fig. 9, and illustrating particularly the booking mechanism and the driving-gear of the machine; and Fig. 14 is a detail elevation of one of the pinions mounted upon the rollers of the booking means and adapted to rotate with the shaft in one direction only.

The frame of my machine may be of any preferred construction; but I prefer to construct it with an oblong bed $b$ and supporting-legs $c$, the bed $b$ being preferably of extended area to facilitate the work of the operator. An inclined spreading-table $d$ is mounted upon this bed near one end thereof and has a guiding-groove $e$ extending from end to end and midway thereof. One end of this spreading-table is notched, as at $f$, to accommodate a pair of sprocket-wheels $g$ and $h$, supported one above the other and a short distance apart. A second pair of sprocket-wheels $i$ and $j$ in line with the sprocket-wheels $g$ and $h$ (which, as will be seen, are in line with the groove in the spreading-table) are supported a short distance from the opposite end of the bed, and a pair of chain-guides are disposed one above the other between these sprocket-wheels.

The sprocket-wheels $g$ and $h$ are mounted loosely upon spindles $m$ and $n$, supported in brackets $o$ and $p$, secured to the top of the bed, and the sprocket-wheels $i$ and $j$ are mounted rigidly upon a pair of spindles $q$ and $r$, journaled in bearings $s$ and $t$, respectively.

The upper chain-guide is supported by hangers $u$, hung from the spindle $m$, and $v$, hung from a bracket for supporting a counter-shaft to be presently described, such guide consisting of a pair of oblong plates 2, arranged parallel to one another and connected at their top edges to a filling-block 3. It is to the top of this filling-block that the hangers $u$ and $v$ are connected. The lower chain-guide consists of a pair of oblong plates 5, arranged parallel to one another and connected together at their ends by blocks 6, which have downwardly-projecting pins 7 thereon, guided in perforations in a pair of blocks 8 upon the bed, while such chain-guide is yieldingly supported by a pair of expansile springs 9, encirling said pins.

A pair of blades 10 are supported adjustably upon the bed, one at each side of the lower chain-guide and of sufficient height to have their cutting edges located on a level with the top of the latter. These blades are of slightly less length than such chain-guides, and each has a pair of slotted lateral lugs 11 upon its lower edge, through the slots 12 in which a pair of adjusting-screws 13 project and are threaded into the bed. These blades are adjustably mounted to enable them to be set at different distances, according to the size of leaf being stemmed, the larger leaves having, of course, wider stems and midribs than the smaller leaves.

The leaves after the operator has spread them upon the spreading-table are fed to the blades ready to have the midribs severed therefrom by a pair of chains 14 and 15, respectively, which take over the pairs $g$ and $i$ and $h$ and $j$ of the sprocket-wheels, and in order to cause the chains to bear one upon the other I adapt their adjacent portions to lie in the chain-guides and I mount a series of rollers 16 between the lower portions of the plates of the upper guide and a second series of rollers 17 between the plates of the lower guide. The rollers 16 are disposed relatively to the sprocket-wheel $g$ in such a manner as to cause the receiving ends of the chain-bands to deflect from one another, as at 18, thus facilitating the insertion of the leaf.

When the leaf has been placed upon the blades, pressure is applied thereto, and the midrib is thereby severed from the body of the leaf. This pressure is applied by a pair of presser-rollers 20, carried rotatably upon a pair of trunnions 21, carried rigidly by the lower ends of a pair of rods 22, having their upper halves threaded and passed upwardly through perforations in the flanges 23 of a U-bracket 24, secured upon the end of a reciprocatory bar to be presently described. A nut 25 is threaded upon each of these rods between the flanges of the bracket and near the lower one, and an expansile spring 26 bears between each nut and the upper flange, these nuts serving as a means for varying the tension of the springs, while the upper ends of the rods are squared, as at 27, and a pair of interiorly-squared washers 28, secured rigidly upon the top of the upper flange, prevents the rods from turning. The reciprocatory bar 19 is preferably of T cross-section and arranged with its flange horizontal and its web vertical and projecting upwardly therefrom. One end of this bar has the flanged bracket secured rigidly thereon, and its main length slides in a guideway consisting of two portions 29, formed with grooves 30, which receive the sides of the flange of the bar. The guide portions are arranged a short distance apart to accommodate a downwardly-facing toothed rack 31, secured rigidly upon the under side of the bar. A counter-shaft 32 is journaled in a pair of bearing-brackets 33, bolted or otherwise secured to the ends of the guide portions, and has a pinion 34 mounted loosely thereon and prevented from shifting along the shaft in one direction by a collar 35, rigidly mounted upon the shaft, said pinion being engaged by said rack, while a collar 36, rigidly upon the shaft at the opposite side of the pinion, has a series of ratchet-teeth 37 formed thereon, with which a spring-pawl 38, carried by the pinion, intermeshes, thus rotating said counter-shaft when the rack travels in one direction and allowing it to remain idle when the rack travels in the opposite direction. A pinion 40 is mounted rigidly upon one end of this counter-shaft and intermeshes with a pinion 42, mounted rigidly upon spindle $q$, which in turn intermeshes with a pinion 43, mounted rigidly upon spindle *r*, while it is from spindle *r* that movement is transmitted intermittently to means for separating the severed leaf halves from one another.

The means for separating the severed leaf-halves from one another consists of a pair of laterally-traveling aprons, one located at each side of the severing means and each being adapted to carry a leaf-half to the booking means. These aprons, the means for transferring the leaf-half therefrom to the booking means, together with the latter, at both sides of the blades are the same, and I will therefore describe in detail only the means for acting upon one leaf-half. Each of these aprons consists of a pair of rollers 50 and 51, mounted in brackets 52 and a frame 53, the bracket being secured upon the bed of the machine and is vertically slotted, and a bushing 54 is adjustably set in the slot of each bracket and has the trunnions 55 of roller 50 journaled therein, which enables this roller to be adjusted toward and from roller 51 for purposes of fitting. The frame 53, in which roller 51 is journaled, is pivoted at its opposite end to the bracket of a roller 56. (The spindle *m* for carrying the outer sprocket-wheel is similarly adjustably supported.) This roller 56 is supported in brackets 57, and this latter roller and the roller 51 are formed with a series of circumferential depressions 58, and a series of tapes 59 are looped over these rollers and lie in such depressions and collectively constitute the apron. This apron is driven by and in unison with the feed-chains by a gear 43, mounted upon shaft *r*, which has a pair of bevel-gears 60 mounted rigidly upon each end thereof and which intermesh with a second pair of bevel-gears 61, one only of which will be further alluded to. This gear 61 is mounted rigidly upon the trunnion 66 (which is elongated for the purpose) of roller 56, and a pinion 67, also rigidly upon trunnion 66, intermeshes with a pinion 68 upon a stub-shaft 60, also carrying rigidly a pulley 70, around which and a pulley 71 upon roller 51 a driving-belt 72 is looped.

The frame 53 is lifted to raise roller 51 from roller 50 and allow the leaf conveyed by the chain's freedom to pass between said rollers to its proper position upon the tapes. This is effected by a lever 134, fulcrumed between its ends, as at 135, to the guide 29 and connected at one end by a link 136 to frame 53 and at its opposite end by a link 137 to one end of a second lever 138, fulcrumed at its opposite end to the guide 29.

The weight of the frame normally depresses the end connected thereto of lever 134, and consequently raises the opposite end of this lever and the corresponding end of lever 138 and making the latter lever lie normally in an inclined plane above the guide. A laterally-projecting dog upon the reciprocatory bar 19 is adapted to ride upon and depress this latter lever when the bar moves away from the spreading-table, thus raising the frame and with it roller 51; but as this lever is shorter than the extent of travel of the bar the dog releases it and the roller 51 is again allowed to rest upon roller 50. In order to allow this dog to pass the upwardly-projecting lever as the bar advances, I construct it with its engaging portion in the form of a latch 139, pivoted, as at 140, to a bracket 141, rigidly secured to the bar, the side of this bracket toward the spreading-table being squared to constitute an abutment 142 to receive the thrust due to the frictional contact between the dog and the lever it depresses and the opposite side of the latch being rounded to allow it to turn in that direction upon its axis when it comes into contact with the lever as the bar advances toward the spreading-table, while a spring 143 yieldingly retains this latch in engaging position. A plate 244 is located in close proximity to the under side of the tapes and serves to support said tapes and the leaf portion carried thereby and prevents an end of the leaf hanging below the tapes. The leaf half is transferred from this apron to the booking device and simultaneously dampened by means of an oscillating fly consisting of a cross-bar 80, fulcrumed in bearings 81 upon the bed and having long resilient fingers 82 and normally resting with the curved ends of its fingers in a series of circumferential depressions 83 in the roller 56 between the depressions 58 therein. This cross-bar has a counterbalance 84 thereon.

Oscillatory movement is imparted to the fly by means of a pinion 85, mounted rigidly upon one end of the bar and intermeshing with a quadrantal gear 86, which has an upwardly-projecting pin thereon straddled by the forked end 87 of a lever 88, fulcrumed upon a standard 89 and having its outer end turned up, as at 90, and in the path of one of a pair of pins 91 upon the slide-bar 28, while a retractile helical spring 92 yieldingly maintains the parts in a position with the fly ready to receive the leaf half. The dampener consists of a series of resilient perforated tapered boxes 93, secured one upon the carrying side of each finger of the fly and adapted to receive a sponge or other absorbent material. These boxes are connected to the fingers by a lip 94, formed in one with each box and fastened to each finger. When the fly presses upon the leaf halves, the boxes will be pressed against the fingers and the moisture carried by the absorbent squeezed out through the perforations and onto such leaf halves.

The booking device consists of a pair of aprons 100 and 101, arranged at right angles to the fly and adapted to intermittently travel toward one another. These aprons are looped over two pairs of rollers 102, 103, 104, and 105, the rollers 103 and 104 being supported in bearings 106 upon an adjustable frame 107, carried in guideways 108 on two of the opposite sides of an opening 109 in the bed of the machine, the rollers 102 and 105 being supported in bearings upon the said sides of the opening. The aprons are caused to travel toward one another by a pair of pinions 112, mounted loosely upon corresponding ends of the rollers 103 and 104 and adapted to rotate these rollers when they (the pinions) are rotated in one direction only. This action is caused by a pair of tangentially-curved grooves 114, terminating at their outer ends in a semicircular wall corresponding in radius to a pair of jam-rollers 115, which when the pinions are rotated in one direction rotate freely in the spaces 114 and act as antifriction-rollers between the pinions and their carrying-rollers and when the pinions are rotated in the opposite direction tend to be drawn into the tangentially-curved slots, and consequently become jammed between the pinions and their carrying-rollers and cause them to rotate together. These pinions are rotated by a pair of toothed racks 120, intermeshing therewith and guided in guides 121, carried by the adjustable frame, while their lower ends are secured to a cross-head 122, having a horizontal slot 123 thereon. A combined gear and crank wheel 124, carrying a pin 125, is rotatably supported in a position to have its pin project into said slot, which accommodates its rotative movement, while it is vertically reciprocated thereby. The fly places the leaf halves upon these aprons in such a way that the aperture between said aprons is preferably coincident with the transverse center of the leaf half when it is so placed. After a predetermined number of these leaf halves have been placed upon these aprons they are folded upon themselves and packed in book form in a receptacle, these aprons constituting a portion of the means to this end. A creaser creases the leaf halves and causes them to be drawn down by the aprons. The creaser consists of an angular bar 126, carried by the cross-head 122, and the horizontal portion whereof when the cross-head is in its uppermost position extends over the leaf halves and when the cross-head sinks creases the leaf halves and forces them between the aprons, which deliver them upon a presser-plate 127, which forces them into one end of the receptacle before mentioned and to be presently described. This presser-plate 127 is pivoted at its lower end to the lower ends of a pair of hangers 128, depending from the adjustable frame, and a pitman 129 is pivotally connected at one end thereto and its other end rotatably to a cranked portion 130 of a transverse shaft 131. These rollers 103 and 104 are made adjustable relatively to rollers 102 and 105 to accommodate different lengths of aprons, and thereby allow the creaser to be adjusted to always act upon the middle of the leaf half. The creaser is assisted in its upward movement by a pair of weighted cords 300, running over pulleys 301 and connected to the cross-head 122.

The shaft 131 has a pair of gears 132 mounted one on each end thereof, and these gears are rotated, through the medium of a pair of idlers 133, by the combined gear and crank wheels 124, with the teeth of which and said gears 132 said idlers intermesh. The receptacle before mentioned consists of a drawer 144, slidably supported upon a guide-plate 145 and having one end inclined, as at 146, to allow the booked leaves to lie thereon without their lower edges being crushed, while the other end of the drawer is open to allow of its withdrawal. A bell 147, having a trip-lever 148 for ringing it, is supported upon the under side of the table, with its trip-lever projecting across the path of the drawer to be tripped thereby when the drawer has received the desired number of books.

It is of course understood that with the exception of the crank-shaft 131 all of these parts for separating the leaf halves from one another, delivering them to the booking device, and the booking device themselves are duplicated, as before pointed out, in order that a predetermined number of each kind will be booked independently of the other kind.

The main driving-gear, from which the reciprocatory bar 19 and the combined gear and crank wheels 124 receive their motion, consists of a main driving-shaft 150, (driven from any available source of power through sprocket-and-chain connection 149 or otherwise,) having a main crank-wheel 151 rigidly upon one end thereof with a crank-pin 152, upon which one end of a pitman 153 is pivotally mounted, the opposite end thereof being pivotally connected, as at 154, to a depending arm 155, cast in one with the under side of the reciprocatory bar 19, (see Fig. 2,) thus operatively connecting said bar 19 and all the parts operatively connected thereto to the initial driving-gear.

A gear 156 is mounted rotatably upon the main shaft and intermeshes with one of the gears 124. This gear 156 has clutch-teeth 158 upon one side thereof, with which a clutch-block 159, slidable upon and rotatable with the main shaft, is adapted to engage. A lever 160, having its upper end forked, as at 161, to engage the clutch-block, is pivoted, as at 162, to a platform carried by the lower portions of the legs of the table, and a vertical shaft 163, supported in a bearing 164 and a bracket 165 auxiliary to such bearing, both upon said platform, is connected to the lever 160 by a toggle connection 159 and has a laterally-projecting dog 166 rigidly carried thereby, while a laterally-projecting dog 167 is rigidly carried by the main driving-shaft. A gear 168, provided with as many teeth as leaf halves required to be included in each book and having a laterally-projecting rigid dog 169, is located in a position to be rotated tooth by tooth by the dog 167 as the main shaft rotates and to have its dog 169 engage the dog 166 upon the vertical shaft and shift the latter and through it the clutch-block, and consequently operate the crease once in every fifty cycles of operation of the machine. This gear 168 is retained against accidental rotation by a spring-dog 170 engaging the teeth thereof, and a retractile helical spring 172 yieldingly retains the clutch-block out of engagement.

The operation of my improved machine is as follows: The operator first spreads the leaf to be treated upon the spreading-table, with its midrib located in the groove, and smooths it. He then pushes it gently down and off the table and into the flared space between the ends of the conveyer-chains. This is done while the rack is moving toward the spreading-table. The chains then as the racks recede convey the leaf to the blades. Upon the rack again advancing the presser-rollers will press the leaf upon the blades, thereby severing the midrib from the body of the leaf. The next recession of the rack simultaneously causes the conveyer-chains to convey the severed midrib and stem away from the blades and drop it through an opening 200 in the bed, place another leaf in readiness to be stemmed, dampen the severed halves of the leaf, and remove them in opposite directions from the blades (thereby effectively sorting them) to the booking device through the medium of the laterally-traveling aprons and the flies. When the halves of fifty leaves have been piled upon the aprons of the booking devices, the clutch-block 159 will be automatically shifted and the leaf halves creased and simultaneously forced between the folding-aprons, which are also simultaneously actuated, and delivered upon the presser-plate, which will pack them into the drawer. When this drawer has received a predetermined number of books, it will have been pushed out sufficiently to sound the alarm. The number of leaf halves to be included in each book can be varied by substituting for gear 168 another gear with a number of teeth corresponding to the number of leaf halves it may be desired to include in each book.

I do not claim the adjustment of the blades relating to one another, because it forms a part of the subject-matter of a patent granted to me October 6, 1903, under No. 740,675.

What I claim is as follows:

1. In a machine for the treatment of tobacco-leaves, means for stemming such leaves, means for booking such leaves, said booking means coacting with said stemming means, means for feeding the stemmed leaves from the stemming means to the booking means, and means for automatically delivering the booked leaves from the booking means.

2. In a machine for the treatment of tobacco-leaves, the combination with a pair of stationary blades arranged substantially parallel to one another and a short distance apart, and a presser device acting intermittently upon such blades, of means intermittently feeding such leaves upon the blades in position to be acted upon by the presser device for the purpose of stemming said leaves.

3. In a machine for the treatment of tobacco-leaves, the combination with a pair of stationary blades arranged substantially parallel to one another and a short distance apart, and a presser device acting intermittently upon such blades, of means intermittently feeding such leaves upon the blades in position to be acted upon by the presser device, means for removing the stemmed leaves away from said blades.

4. In a machine for the treatment of tobacco-leaves, the combination with a pair of stationary blades arranged substantially parallel to one another and a short distance apart, and a presser device acting intermittently upon such blades, of means intermittently feeding such leaves upon the blades in position to be acted upon by the presser device, means for removing the stemmed leaves away from said blades, and means for dampening said stemmed leaves.

5. In a machine for the treatment of tobacco-leaves, the combination with a pair of blades arranged substantially parallel to one another and a short distance apart, and a presser device acting intermittently upon such blades, of means intermittently feeding such leaves upon the blades in position to be acted upon by the presser device, means for removing the stemmed leaves away from said blades, and means for dampening said stemmed leaves simultaneously with the removal thereof from the blades.

6. In a machine for the treatment of tobacco-leaves, the combination with a pair of stationary blades arranged substantially parallel to one another and a short distance apart, and a presser device acting intermittently upon such blades, of means intermittently feeding such leaves upon the blades in position to be acted upon by the presser device, a booking device, means for delivering the stemmed leaves from said blades to the booking device, means for actuating said booking device after a predetermined number of leaves have been fed thereto.

7. In a machine for the treatment of tobacco-leaves the combination with a pair of blades arranged substantially parallel to one another and a short distance apart, and a presser device acting intermittently upon such blades, of means intermittently feeding such leaves upon the blades in position to be acted upon by the presser device, a booking device, and means for delivering the stemmed leaves from said blades to the booking device, means for actuating said booking device after a predetermined number of leaves have been fed thereto, means for removing the stemmed leaves away from said blades, and means for dampening said stemmed leaves simultaneously with the removal thereof from the blades.

8. In a machine for the treatment of tobacco-leaves, the combination with a pair of blades arranged substantially parallel to one another and a short distance apart, and a presser device acting intermittently upon such blades, of a conveyer-belt located between said blades and extending longitudinally thereof, means for causing said conveyer-belt to travel during the intervals the presser device is away from the blades and feed the leaves upon the blades in position to be acted upon by the presser device and means for retaining the leaf to be stemmed upon said belt, for the purpose set forth.

9. In a machine for the treatment of tobacco-leaves, the combination with a pair of blades arranged substantially parallel to one another and a short distance apart, and a presser device acting intermittently upon such blades, of a conveyer-belt located between said blades and extending longitudinally thereof, means for causing said conveyer-belt to travel during the intervals the presser device is away from the blades and feed the leaves upon the blades in position to be acted upon by the presser device, means for retaining the leaf to be stemmed upon said belt, means for removing the stemmed leaves away from said blades, for the purpose set forth.

10. In a machine for the treatment of tobacco-leaves, the combination with a pair of blades arranged substantially parallel to one another and a short distance apart, and a presser device acting intermittently upon such blades, of a conveyer-belt located between said blades and extending longitudinally thereof, means for causing said conveyer-belt to travel during the intervals the presser device is away from the blades and feed the leaves upon the blades in position to be acted upon by the presser device, means for retaining the leaf to be stemmed upon said belt, means for removing the stemmed leaves away from said blades, and means for dampening said stemmed leaves, for the purpose set forth.

11. In a machine for the treatment of tobacco-leaves, the combination with a pair of blades arranged substantially parallel to one another and a short distance apart, and a presser device acting intermittently upon such blades, of a conveyer-belt located between said blades and extending longitudinally thereof, means for causing said conveyer-belt to travel during the intervals the presser device is away from the blades and feed the leaves upon the blades in position to be acted upon by the presser device, means for retaining the leaf to be stemmed upon said belt, means for removing the stemmed leaves away from said blades, and means for dampening said stemmed leaves simultaneously with the removal thereof from the blades, for the purpose set forth.

12. In a machine for the treatment of tobacco-leaves, the combination with a pair of blades arranged substantially parallel to one another and a short distance apart, and a presser device acting intermittently upon such blades, of a conveyer-belt located between said blades and extending longitudinally thereto, means for causing said conveyer-belt to travel during the intervals the presser device is away from the blades and feed the leaves upon the blades in position to be acted upon by the presser device, a booking device, means for delivering the stemmed leaves from said blades to the booking device means for actuating said booking device after a predetermined number of leaves have been fed thereto, for the purpose set forth.

13. In a machine for the treatment of tobacco-leaves, the combination with a pair of blades arranged substantially parallel to one another and a short distance apart, and a presser device acting intermittently upon such blades, of a conveyer-belt located between said blades and extending longitudinally thereof, means for causing said conveyer-belt to travel during the intervals the presser device is away from the blades and feed the leaves upon the blades in position to be acted upon by the presser device, a booking device, means for delivering the stemmed leaves from said blades to the booking device, means for actuating said booking device after a predetermined number of leaves have been fed thereto, means for removing the stemmed leaves away from said blades, and means for dampening said stemmed leaves simultaneously with the removal thereof from the blades, for the purpose set forth.

14. In a machine for the treatment of tobacco-leaves the combination with a pair of blades arranged substantially parallel to one another, and a short distance apart, a presser device acting intermittently upon said blades of a spreading and guiding table consisting of a flat member with a groove extending across same in line with the space between said blades, and a traveling feed device for conveying the leaves to be treated from the said table to said blades substantially as described and for the purpose set forth.

15. In a machine for the treatment of tobacco-leaves the combination with a pair of blades arranged substantially parallel to one another and a short distance apart, and a presser device bearing intermittently upon said blades, of means for placing the leaves upon said blades during the intervals the presser device is away from said blades said means consisting of a pair of belts located one above the other and the lower between said blades, and means for causing said belts to travel in opposite directions during the intervals the presser device is away from the blades, for the purpose set forth.

16. In a machine for the treatment of tobacco-leaves the combination with a pair of blades arranged substantially parallel to one another and a short distance apart, and a presser device bearing intermittently upon said blades, of means for placing the leaves upon said blades during the intervals the presser device is away from said blades said means consisting of a pair of belts in the form of chains located one above the other and the lower between said blades, and means for causing said belts to travel in opposite directions during the intervals the presser device is away from the blades, for the purpose set forth.

17. In a machine for the treatment of tobacco-leaves the combination with a pair of blades arranged substantially parallel to one another and a short distance apart, and a presser device bearing intermittently upon said blades, of means for placing the leaves upon said blades during the intervals the presser device is away from said blades said means consisting of a pair of belts located one above the other and the lower between said blades said belts being deflected one from the other at one end to present a flared intake, and means for causing said belts to travel in opposite directions during the intervals the presser device is away from the blades, for the purpose set forth.

18. In a machine for the treatment of tobacco-leaves the combination with a pair of blades arranged substantially parallel to one another and a short distance apart, and a presser device bearing intermittently upon said blades, of a pair of rollers located one at each end of and in a line between said blades, a chain-guide between said blades and extending from one to the other of said rollers, a series of antifriction-rollers mounted in said chain-guide, a chain looped around said rollers and running in said guide, means for causing said chain to travel during the intervals the presser device is away from the blades, for the purpose set forth.

19. In a machine for the treatment of tobacco-leaves the combination with a pair of blades arranged substantially parallel to one another and a short distance apart, and a presser device bearing intermittently upon said blades, of a pair of rollers located one at each end of and in a line between said blades, a chain-guide between said blades and extending from one to the other of said rollers, a series of antifriction-rollers mounted in said chain-guide, a chain looped around said rollers and running in said guide, a second pair of rollers located above said first-mentioned pair of rollers a chain-guide extending from one to the other of said last-mentioned rollers, a guiding-roller carried by said chain-guide a short distance from one of the said upper rollers and in close proximity to the corresponding roller of the lower pair, a series of antifriction-rollers carried by said last-mentioned chain-guide, a chain looped over said upper rollers and the chain-guide, means for causing said chains to travel in opposite directions during the intervals the presser device is away from the blades, for the purpose set forth.

20. In a machine for the treatment of tobacco-leaves the combination with a pair of blades arranged substantially parallel to one another and a short distance apart, and a presser device bearing intermittently upon said blades, of a pair of rollers located one at each end of and in a line between said blades, a chain-guide between said blades and extending from one to the other of said rollers, a series of antifriction-rollers mounted in said chain-guide, a chain looped around said rollers and running in said guide, means for retaining the leaf to be stemmed upon the chain, means for causing said chain to travel during the intervals the presser device is away from the blades, and a spreading and guiding table consisting of a flat member with a groove extending across same in line with the space between said chains, substantially as described and for the purpose set forth.

21. In a machine for the treatment of tobacco-leaves the combination with a leaf-stemming device, of an apron extending laterally to said stemming device, a fly located at the end of said apron, means for causing said apron to travel during the intervals between the operations of said stemming device, means for actuating said fly at the completion of the travel of said apron, a booking device located within the radius of movement of said fly, and devices for operating said booking means upon the completion of a predetermined number of actions of said fly, for the purpose set forth.

22. Means for booking stemmed tobacco-leaves consisting of a pair of rollers arranged adjacent to one another, a creaser reciprocating at right angles to said rollers and in line with and entering the space therebetween, means for causing said rollers to rotate in opposite directions simultaneously with the movement of said creaser toward such space, a receptacle adjacent to such rollers and adapted to have said stemmed tobacco-leaves piled therein and means whereby such receptacle is automatically moved to accommodate the leaves.

23. Means for booking stemmed tobacco-leaves consisting of a pair of rollers arranged adjacent to one another, a creaser reciprocating at right angles to said rollers and in line with and entering the space therebetween, means for causing said rollers to rotate in opposite directions simultaneously with the movement of said creaser toward such space, a movable receptacle adjacent to such rollers and adapted to have said stemmed tobacco-leaves piled therein, means for announcing when said receptacle has its full complement of leaves, and means whereby such receptacle is automatically moved to accommodate the leaves.

24. In a machine for the treatment of tobacco-leaves a leaf-stemming device, means for booking the stemmed leaves, and means for feeding the stemmed leaves from the stemming device to the booking means, said booking means consisting of a pair of aprons arranged adjacent to one another in tandem, a creaser reciprocating at right angles to said aprons and in line with and entering the space therebetween, means for causing said aprons to travel toward one another simultaneously with the movement of said creaser toward such space, substantially as described and for the purpose set forth.

25. In a machine for the treatment of tobacco-leaves a leaf-stemming device, means for booking the stemmed leaves, and means for feeding the stemmed leaves from the stemming device to the booking means said booking means consisting of a pair of aprons arranged adjacent to one another in tandem, a creaser reciprocating at right angles to said aprons and in line with and entering the space therebetween, means for causing said aprons to travel intermittently toward one another and simultaneously with the movement of said creaser toward such space, a drawer located beneath said aprons, a presser-plate located beneath the space between said aprons, means for supporting said presser-plate independently of said drawer, said drawer having one end open and the other end closed, means for moving said presser-plate toward the closed end of said drawer upon the completion of each movement of said aprons, substantially as described and for the purpose set forth.

26. In a machine for the treatment of tobacco-leaves, a stemming device, means for booking the stemmed leaves, and means for feeding the stemmed leaves from the stemming device to the booking means, said booking means consisting of a pair of aprons arranged adjacent to one another in tandem, a creaser reciprocating at right angles to said aprons and in line with and entering the space therebetween, means for causing said aprons to travel intermittently toward one another and simultaneously with the movement of said creaser toward such space, a drawer located beneath said aprons, a presser-plate located beneath the space between said aprons, means for supporting said presser-plate independently of said drawer, said drawer having one end open and the other end closed, said closed end lying at an angle to the vertical, means for moving said presser-plate toward the closed end of said drawer upon the completion of each movement of said aprons an annunciator having an actuating-lever projecting across the path of said drawer and adapted to be engaged by the closed end of the latter when it has its full complement of book-leaves, substantially as described and for the purpose set forth.

27. In a machine for the treatment of tobacco-leaves, the combination with a stemming device, of means for booking the stemmed leaves and means for feeding the stemmed leaves from the stemming device to the booking means, said booking means consisting of a pair of aprons arranged adjacent to one another in tandem, a creaser, means for reciprocating said creaser at right angles to said aprons and in line with and entering the space therebetween after a predetermined number of actions of said feeding means, means for causing said aprons to travel intermittently toward one another and simultaneously with the movement of said creaser toward such space, a drawer located beneath said aprons, a presser-plate located beneath the space between said aprons, means for supporting said presser-plate independently of said drawer, said drawer having one end open and the other end closed, means for moving said presser-plate toward the closed end of said drawer upon the completion of each movement of said aprons, substantially as described and for the purpose set forth.

28. In a machine for the treatment of tobacco-leaves, the combination with a stemming device, of means for booking the stemmed leaves and means for feeding the stemmed leaves from the stemming device to the booking means, said booking means consisting of a pair of aprons arranged adjacent to one another in tandem, a creaser, means for reciprocating said creaser at right angles to said aprons and in line with and entering the space therebetween after a predetermined number of actions of said feeding means, means for causing said aprons to travel intermittently toward one another and simultaneously with the movement of said creaser toward such space, a drawer located beneath said aprons, a presser-plate located beneath the space between said aprons, means for supporting said presser-plate independently of said drawer, said drawer having one end open and the other end closed, said closed end lying at an angle to the vertical, means for moving said presser-plate toward the closed end of said drawer upon the completion of each movement of said aprons.

29. In a machine for the treatment of tobacco-leaves the combination with a stemming device, of means for booking the stemmed leaves and means for feeding the stemmed leaves from the stemming device to the booking means, said booking means consisting of a pair of aprons arranged adjacent to one another in tandem, a creaser, means for reciprocating said creaser at right angles to said aprons and in line with and entering the space therebetween after a predetermined number of actions of said feeding means, means for causing said aprons to travel intermittently toward one another and simultaneously with the movement of said creaser toward such space, a drawer located beneath said aprons, a presser-plate located beneath the space between said aprons, means for supporting said presser-plate independently of said drawer, said drawer having one end open and the other end closed, an annunciator having an actuating-lever projecting across the path of said drawer and adapted to be engaged by the closed end of the latter when it has its full complement of book-leaves, substantially as described and for the purpose set forth.

30. In a machine for the treatment of tobacco-leaves, the combination with a pair of blades arranged substantially parallel to one another and a short distance apart, a bar reciprocating longitudinally to said blades and adjacent to the cutting edges thereof, and a presser-roller carried by said bar and adapted to bear upon said blades, of a conveyer-belt located between said blades and extending longitudinally thereto, means actuated by said bar for causing said conveyer-belt to travel during the movement of said bar in one direction only, substantially as described and for the purpose set forth.

31. In a machine for the treatment of tobacco-leaves, the combination with a pair of blades arranged substantially parallel to one another and a short distance apart, a bar reciprocating longitudinally to said blades and adjacent to the cutting edges thereof, a presser-roller carried by said bar and adapted to bear upon said blades, of a conveyer-belt located between said blades and extending longitudinally thereto, a toothed rack upon said bar, a shaft extending at right angles to said rack and having a pinion mounted loosely thereon and engaged by said rack, a ratchet-and-pawl connection between said pinion and said shaft whereby said shaft will rotate with said pinion in one direction only, and a rotative connection between said shaft and said conveyer-belt, substantially as described and for the purpose set forth.

32. In a machine for the treatment of tobacco-leaves, the combination with a pair of blades arranged substantially parallel to one another and a short distance apart, a bar reciprocating longitudinally to said blades and adjacent to the cutting edges thereof, a presser-roller carried by said bar and adapted to bear upon said blades, of a conveyer-belt located between said blades and extending longitudinally thereto, a second belt located above said conveyer-belt and extending parallel and in close proximity thereto, a toothed rack upon said bar, a shaft extending at right angles to said rack and having a pinion mounted loosely thereon and intermeshing with the teeth of said rack, a ratchet-and-pawl connection between said pinion and said shaft whereby said shaft will rotate with said pinion in one direction only, and a rotative connection between said shaft and said belts whereby said belts will travel in opposite directions, substantially as described and for the purpose set forth.

33. In a machine for the treatment of tobacco-leaves, the combination with a pair of blades arranged substantially parallel to one another and a short distance apart a bar reciprocating longitudinally to said blades and adjacent to the cutting edges thereof, a presser-roller carried by said bar and adapted to bear upon said blades, of a conveyer-belt located between said blades and extending longitudinally thereto, a second belt located above said conveyer-belt and extending parallel and in close proximity thereto, one end of one of said belts deflecting from the corresponding end of the other belt, a toothed rack upon said bar, a shaft extending at right angles to said rack and having a pinion mounted loosely thereon and intermeshing with the teeth of said rack, a ratchet-and-pawl connection between said pinion and said shaft whereby said shaft will rotate with said pinion in one direction only, and a rotative connection between said shaft and said belts whereby said belts will travel in opposite directions, substantially as described and for the purpose set forth.

34. In a machine for the treatment of tobacco-leaves, the combination with leaf-stemming means, of an apron extending at right angles to said stemming means, a frame pivoted above said apron and having a roller extending transversely to and normally resting upon the end of said apron adjacent to said stemming means, means for feeding the leaves to be stemmed to said stemming means, said apron being in a position to support a portion of each leaf while it is being stemmed, means for raising said roller from said apron while a leaf is being fed to the stemming means, means for causing said apron to travel away from said stemming means upon the completion of each stemming operation, substantially as described and for the purpose set forth.

35. In a machine for the treatment of tobacco-leaves, the combination with leaf-stemming means and means for booking the stemmed leaves, of an apron extending from said stemming means toward said booking means, a frame pivoted at one end above said apron and having a roller at its other end, said roller extending transversely to and normally resting upon the end of said apron adjacent to said stemming means, means for feeding the leaves to be stemmed to said stemming means, said apron being in a position to support a portion of each leaf while it is being stemmed, means for raising said roller from said apron while a leaf is being fed to the stemming means, means for causing said apron to travel away from said stemming means upon the completion of each stemming operation, a fly having its axis at right angles to the direction of travel of said apron and between the latter and the booking means, and being of sufficient radial length to vibrate from contact with said apron to a position to deliver a stemmed leaf portion to said booking means, and means for vibrating said fly substantially as described and for the purpose set forth.

36. In a machine for the treating of tobacco-leaves, the combination with means for stemming such leaves, of means for separating the halves of each leaf laterally from one another.

37. In a machine for the treatment of tobacco-leaves, the combination with means for stemming such leaves, of means for booking the stemmed leafed portions separated from the opposite sides of the stem, separately, and means for automatically delivering said booked leaf halves from said booking means.

38. In a machine for the treatment of tobacco-leaves, the combination with means for stemming such leaves, of a pair of booking devices located one at each side and a short distance from said stemming means, independent feed devices for feeding the stemmed leaf portions separated from the opposite sides of the stem to said booking devices and means for automatically delivering said booked leaf halves from said booking devices.

39. In a machine for the treatment of tobacco-leaves, the combination with a pair of blades arranged parallel to one another and a short distance apart, a bar reciprocating longitudinally to said blades and adjacent to the cutting edges thereof, and a presser-roller carried by said bar and adapted to bear upon the cutting edges of said blades, of a conveyer-belt located between said blades and extending longitudinally thereto, a second belt located above said conveyer-belt and extending parallel and in close proximity thereto, a toothed rack upon said bar, a shaft extending at right angles to said rack and having a pinion mounted loosely thereon and intermeshing with the teeth of said rack, a ratchet-and-pawl connection between said pinion and shaft whereby said shaft will rotate with said pinion in one direction only, a rotative connection between said shaft and said belts whereby said belts will travel in opposite directions, an apron extending from said blades at right angles thereto and in position to support a portion of each leaf while it is being stemmed, a frame pivoted at one end above said apron and having a roller at its other end, said roller extending transversely to and normally resting upon the end of said apron adjacent to said blades, means actuated by said reciprocatory bar for raising said frame upon its axis while said conveyer-belt is conveying a leaf to the blades, means for causing said aprons to travel away from said blades upon the completion of each stemming operation, a fly having its axis at right angles to the direction of travel of said apron and in line with the latter, a pair of aprons arranged adjacent to one another in tandem, a creaser reciprocating at right angles to said aprons and in line with and entering the space therebetween, means for causing said aprons to travel intermittently toward one another and simultaneously with the movement of said creaser toward said space, a drawer located beneath said last-mentioned aprons, a presser-plate located beneath the space between said aprons, means for supporting said presser-plate independently of and within said drawer, said drawer having one end open and the other end closed, and means for slidably supporting said drawer, substantially as described and for the purpose set forth.

40. In a machine for the treatment of tobacco-leaves a leaf-stemming device, means for booking the stemmed leaves, and means for feeding the stemmed leaves from the stemming device to the booking means, said booking means consisting of a pair of aprons arranged adjacent to one another in tandem, a creaser reciprocating at right angles to said aprons and in line with and entering the space therebetween, means for causing said aprons to travel toward one another simultaneously with the movement of said creaser toward such space, and yielding means for assisting the return movement of said creaser, substantially as described and for the purpose set forth.

In testimony whereof I have affixed my signature in presence of two witnesses.

GUSTAVE ANTOINE MARIER.

Witnesses:
 WILLIAM P. McFEAT,
 FRED. J. SEARS.